March 6, 1956 G. HAGLUND 2,737,376
CONTACTING APPARATUS FOR GASES OR VAPOURS AND LIQUIDS
Filed March 16, 1951 2 Sheets-Sheet 2
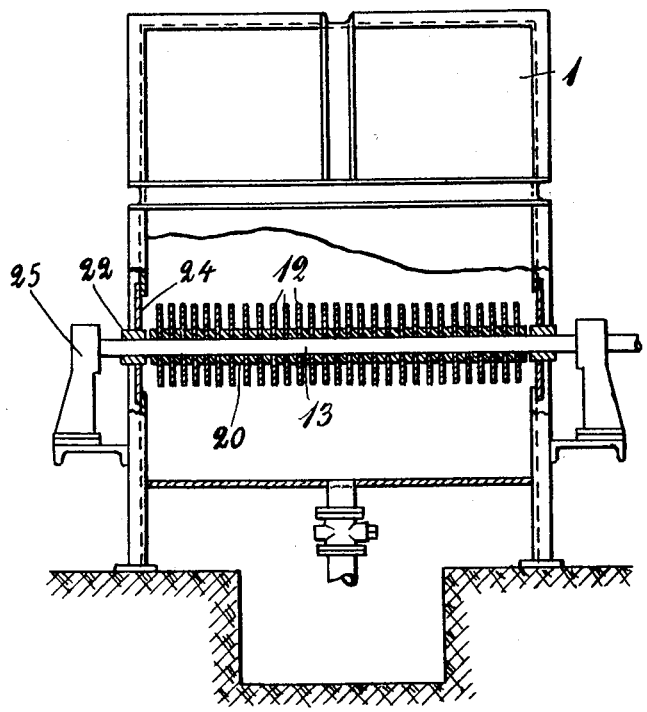
Inventor:
Gustaf Haglund,
By Pierce, Scheffler & Parker,
Attorneys.

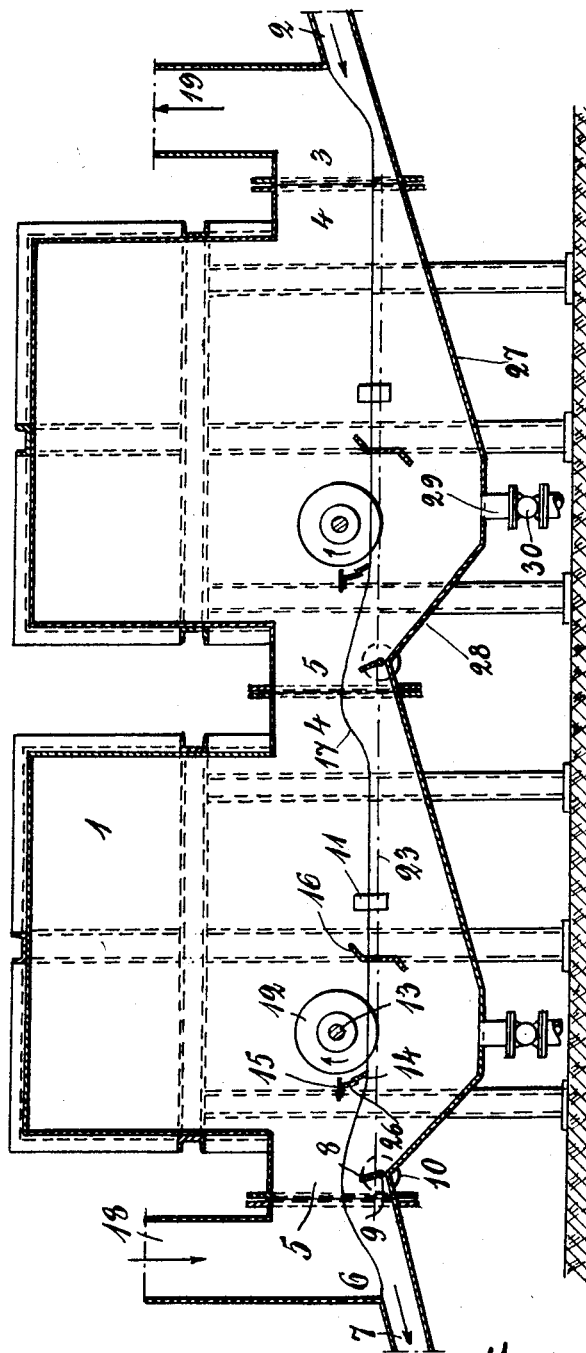

United States Patent Office 2,737,376
Patented Mar. 6, 1956

2,737,376

CONTACTING APPARATUS FOR GASES OR VAPOURS AND LIQUIDS

Gustaf Haglund, Storangen, Sweden, assignor to Aktiebolaget Hedemora Verkstader, Hedemora, Sweden, a company of Sweden Application March 16, 1951, Serial No. 215,904

1 Claim. (Cl. 261—92)

The present invention relates to an apparatus for bringing gases or vapours into intimate contact with a liquid and is more particulraly concerned with apparatus for absorbing gases from gas mixtures or cooling or cleaning gases by passing the gases through a chamber where mechanical spraying devices lift the liquid into the gas space or spread it in atomized state therein so that said liquid will absorb gases, heat or pollutions.

The particular objects of the present invention will be understood from the following survey. If a gas mixture of constant composition and volume passes through the apparatus, the liquid passing through the apparatus shall simultaneously be capable of absorbing a desired quantity of the contents of the gas supplied with regard to some given component and simultaneously deliver a liquid having a content of this component which may be varied at will. This means that the absorption power of the apparatus shall be variable, within certain limits, without variation of the liquid volumes passing through the apparatus, and also that the liquid volumes passing through the apparatus shall be variable without alteration of the absorption power. A consequence of these demands is that the flow of liquid shall be extensively variable practically without causing any variations of the liquid level in the apparatus. Moreover, the liquid inlet and outlet of the apparatus should be so designed as to readily permit a regulation of the desired liquid level in the apparatus also when varying quantities of liquid pass through the apparatus. A plurality of apparatus arranged at equal level should be capable of cooperation whether connected in series or in parallel, and the liquid quantity passing from one apparatus to the other should be variable without any noteworthy influence upon the liquid levels in the apparatus. One object is that the liquid transport shall take place without pumps or the like, even if the apparatus are not arranged at successively lower levels. The liquid to be used for the absorption may have foaming properties or may acquire such properties through the absorption of substances from the gases. Material carried by the gases and which is insoluble in the liquid may accumulate and form layers on the surface of the liquid in the apparatus. Whether foam is created or floating accumulations are formed on the liquid surface the apparatus and particularly the outlet thereof should be constructed in such manner that these collected matters immediately flow off and are removed from the apparatus in order not unfavourably to affect the absorption efficiency. The liquid passing through the apparatus should enter and leave in such a way that a distribution as even as possible will be obtained in the apparatus and that the influence thereof will be as small as possible upon the flow produced by the spraying apparatus. The gas introduced into the apparatus may be supplied with highly varying velocities and, therefore, it is an object of the invention that the gas should be introduced in such a way that the drawbacks connected therewith are reduced. The liquid drops in suspension are as a rule very small and light and may be entrained by a rapid and concentrated gas stream which may result in an incomplete and variable absorption.

In order more or less to obtain these objects and remove the drawbacks mentioned a contacting apparatus is used according to the invention, which apparatus comprises a container having inlet and outlet for liquid and inlet and outlet for gas or vapour and a liquid sprayer consisting of a shaft provided with discs, disc sectors or arms radially mounted thereon at such a level that when the shaft is rotated the discs or the like, with a portion of the shaft, dip into the liquid space of the apparatus. The apparatus is so arranged that the liquid inlet and outlet are disposed on either longitudinal side of the liquid sprayer and the latter is arranged to rotate in such direction that the discs or the like rotate upwards in the liquid space at the outlet side of the sprayer. Furthermore, the liquid outlet has an adjustable overflow. The liquid sprayer should be so arranged that the liquid outlet will be positioned within that range where the liquid level, on account of the rotation of the liquid sprayer, is elevated, preferably within the highest portion of the elevated range. In order to damp or moderate surface movements and retain foam formations on the liquid for maintaining in the immediate vicinity of the sprayer as constant as possible the liquid level as adjusted for a given syraying, a damp board, preferably adjustable vertically and/or horizontally, is with advantage provided in the zone of the liquid level along the liquid sprayer at the inlet side and at some distance from the sprayer, e. g. 0.5–2 disc radii or still closer thereto.

An essential feature of this apparatus is the fact that the propelling of the liquid takes place by or is at least promoted by the spraying mechanism and is controlled by a level controller in such a way that the liquid level is automatically maintained at a desired position even when the liquid flow is varied. This, however, does not hinder that, if desired, the different apparatus may be placed at successively decreasing levels or be provided with pumps where the advantages of arranging the apparatus at equal level cannot be utilized. The effect aimed at may be attained whether the discs throw the liquid up into the gas space of the apparatus or merely lift it as a surface layer on the discs.

The invention will now be described with reference to an embodiment illustrated in the attached drawings, but it is to be understood that this is only an example of reducing the invention into practice.

In the drawings:

Fig. 1 shows a longitudinal cross-section of the apparatus to be described, and

Fig. 2 is an end view, in part in section, of the same apparatus.

The liquid sprayer is here given the shape of a disc-sprayer, but the following description holds good, in applicable portions, also for sprayers having arms or the like or sprayers which merely lift the liquid into the gas space above the bulk of liquid.

In the drawing a plant is shown comprising two units placed at the same level and in series. They consist of a container 1 being preferably rectangular in cross-section and having a sloping bottom so as better to be capable of promoting the motion of the liquid contents of the container as a consequence of the function of the sprayer. The container is wholly closed and is supposed to be capable of resisting low degrees of superpressures. Through the inlet 2 liquid is supplied to the closed distributing box 3 which is directly connected to the one end of the apparatus along the entire length thereof. The liquid is forwarded through the opening 4 which extends as an inlet along the entire breadth of the apparatus into the absorption container. The speed of the entering liquid is equalized in that way and the liquid is evenly distributed towards the spraying device. To the inlet pipe 2 a feeding implement (not shown) may be connected for finely divided solid material, such as lime powder, which may take part in the absorption process by reacting with the absorbed gas, as is the case in the preparation of sulphite cooking acid. Solid substance thus supplied into the inlet pipe 2 is forwarded into the container by the supplied liquid. The liquid or liquid mixture supplied to the apparatus fills the lower portion, the liquid space, of the apparatus and is discharged through the opening 5 extending along the entire breadth of the container at the side opposite the inlet. Through the opening 5 of the second apparatus the liquid is discharged to the closed discharge box 6 directly connected to the container along the entire breadth thereof, and is removed through the outlet 7. In the outlet opening 5 an overflow weir 8 is arranged, connected to a shaft 9 which is passed through the wall of the apparatus and to wheel 10, by which the weir 8 can be turned into different positions. By these means the liquid in the container can be regulated to the desired level for different amounts of liquid passing through the apparatus. By reason of the great length of the outlet opening the variations of the level become insignificant in view of the variations of the liquid supply met with in practice. This is of great importance for the operation because the spraying device is so sensitive with regard to the liquid level in the container. Since the discharge of liquid takes place through an overflow, all surface layers of foam or of any other kind formed in the apparatus will be discharged and removed in the first hand. For ascertaining and establishing the liquid level in the container a window 11 is arranged at the liquid line. The spraying of the liquid flowing through the apparatus up into the container space above the liquid surface is effected by means of the disc sprayer 12 of some structure known in the art and consisting of an adequate number of circular discs mounted on a horizontal rotatable shaft 13 in adequate, preferably relatively short distance from each other separated by distance rings 20. The shaft extends in parallel with those sides of the container where the liquid inlet and outlet are arranged and closer to the outlet than to the inlet. The shaft of the disc sprayer is passed through bushings 22 in movable plates 24 in the side walls of the container to the outside of the latter to be journalled in bearings 25 and be driven. The power is so supplied that the disc sprayer will be able to rotate at that number of revolutions that will best suit the prevailing demand. The liquid level 23 in line with the lower end of the spraying discs is denoted the 0-line.

For cooperation with the disc sprayer 12 there is arranged a spray board 14 having the shape of a circular segment and extending parallelly with and along the entire length of the sprayer. The spray board may be subdivided in two parts as the upper board 26 overlapping and peripherally movable relative to the lower board 14 so as to become vertically extendable or movable or be otherwise displaceable in the peripheral or height direction. Moreover, it may be horizontally displaceable making feasible an adjustment of the same into adequate position relative to the disc sprayer. Furthermore, on the upper edge of the spray board 14 there is a control baffle 15 which is preferably adjustable and will permit a fine adjustment of the horizontal position. By changing the position of the members 14, 26 and 15 the function of the disc sprayer may be influenced in a high degree. Thus, it will be possible to control and regulate the direction, height, distribution, density and drop size of the sprayed liquid as well as the quantity of liquid in the space above the liquid level in the container. The raising and the sinking of the liquid level relative to the 0-line will also exert a decided influence upon the function, capacity and power demand of the spraying apparatus. Therefore, the adjustment of the weir 8 is a determinative part of the functioning of the sprayer mechanism.

In order to attain and during operation maintain the spraying results aimed at it will usually be necessary to take care that the liquid level in the immediate vicinity of the disc sprayer is not disturbed by surgings or wave formations which arise practically always in the bulk of liquid as a consequence of the movement of the disc sprayer in the liquid layer and are even desirable from a stirring point of view. For moderating the surface movements of and detaining the foam on the liquid adjacent to the disc sprayer a vertically and horizontally displaceable damp board, the wave damper 16, is provided. For certain purposes and within given limits the function of the sprayer can be modified by the speed of rotation of the disc sprayer 12, and, therefore, the operation of the apparatus should be adjustable also with regard to revolutions per unit of time.

By the rotation of the disc sprayer the liquid in the apparatus is brought into movement and the sprayer is, therefore, rotated in such a direction that the liquid in the container will be propelled towards the opening 5 and the overflow weir 8 and form a wave 17. The speed of rotation of the disc sprayer 12 and in a certain degree the positioning of the spray board 14, 26, 15 will affect the velocity by which the liquid in the apparatus is propelled towards the opening 5, and by regulating the height position of the weir 8 greater or less quantities of liquid of the wave 17 may be brought to pass over the weir 8. The transport of liquid through the apparatus, or from one apparatus to the other, will thereby be controllable. Obviously, the velocity of movement of the liquid and, consequently, the wave 17 are affected by the degree of submersion of the discs, and, therefore, a substantially constant level will automatically be maintained at a given position of the weir 8 relatively independently of the variations in the quantity of liquid supplied to the apparatus. This is why it is possible to arrange cooperating apparatus at one and the same level.

In addition to the quantity of liquid admitted by the advancing wave 17 a portion of the sprayed liquid quantity may, at suitable position of the spray board 14, be thrown forwards in the direction of the movement of liquid and over the weir 8. Should it be desired, for some reason or other, further to increase the propelling effect upon the liquid in the apparatus the disc sprayer may be provided with shovel-like discs or the like to increase the liquid movement.

To promote a favourable flow of liquid in the container 1, the bottom thereof should be sloping approximately to the point below the disc sprayer 12. This being positioned closer to the outlet 5 than to the inlet 4, the bottom portion 27 at the inlet will not be so steep as the portion 28 near the outlet. At the lowermost portion a drain 29 with a valve 30 is provided for emptying the container.

When the apparatus is in operation and liquid is passed therethrough and spread in the space above the liquid level, as described above, the gas is introduced through the inlet 18 positioned at that end of the container where the liquid is discharged. From the inlet 18 the gas is passed down towards the liquid level and then into the container. Thereby, the gas, which is frequently admitted periodically and at a relatively high pressure, may in the first hand impinge against the liquid surface and from there spread out further and rise through the space filled with liquid drops and leave through the outlet 19 after absorption in one or more apparatus.

All the parts of structure described above which have an influence upon the disc sprayer need, of course, not always cooperate simultaneously with the disc sprayer, but the disc sprayer in combination with one or more of these parts of structure may be sufficient for obtaining a result aimed at. This means also that absorption apparatus may be built for certain purposes equipped with only one or more of said parts of structure cooperating with the disc sprayer.

It is evident from the above that the disc sprayer per se is merely one detail of the combination of various sprayer devices and apparatus members required for obtaining a controllable, adjustable, efficacious and reliable absorption apparatus of such a type that the particular demands on it will be satisfied.

In the appended claim reference has been made to the drawings, but merely for facilitating the reading of the claim and not for the purpose of limiting the scope thereof.

What is claimed is:

Apparatus for contacting gases or vapours with liquids comprising a container having a liquid outlet in the form of an elongated adjustable weir defining a liquid level in said container, a liquid sprayer in the form of a plurality of discs carried by a shaft rotatably secured in the container in parallel with said weir, said discs extending below said liquid level, means for rotating said sprayer in a direction adapted to propel the liquid towards said outlet, a liquid inlet to the container and a spray board positioned between the sprayer and the outlet substantially parallel to the shaft of the sprayer and extending above the liquid level in the container, said board being at a distance from the sprayer discs less than the radius thereof and being adjustable with respect to the sprayer.

References Cited in the file of this patent

UNITED STATES PATENTS

| | | |
|---|---|---|
| 1,528,204 | Greenawalt | Mar. 3, 1925 |
| 1,803,792 | Christensen | May 5, 1931 |
| 2,047,759 | Wingert | July 14, 1936 |
| 2,055,958 | Amos | Sept. 29, 1936 |
| 2,494,602 | Wright | Jan. 17, 1950 |